(12) United States Patent
Eslambolchi et al.

(10) Patent No.: US 7,864,050 B1
(45) Date of Patent: Jan. 4, 2011

(54) METHOD AND APPARATUS FOR PROVIDING AN OBJECT MOVEMENT TRACKING SERVICE IN A COMMUNICATION NETWORK

(75) Inventors: Hossein Eslambolchi, Los Altos Hills, CA (US); Kaveh Hushyar, Saratoga, CA (US); Behzad Nadji, Los Gatos, CA (US); Mostafa Tofighbakhsh, Cupertino, CA (US)

(73) Assignee: AT&T Intellectual Property II, L.P., Reno, NV (US)

( * ) Notice: Subject to any disclaimer, the term of this patent is extended or adjusted under 35 U.S.C. 154(b) by 1381 days.

(21) Appl. No.: 11/284,103

(22) Filed: Nov. 21, 2005

(51) Int. Cl.
G08B 13/14 (2006.01)

(52) U.S. Cl. .............................. 340/572.1; 340/825.36; 340/825.49

(58) Field of Classification Search ............... 340/572.1, 340/573.4, 539.1, 539.13, 539.15, 825.36, 340/825.49, 5.92; 705/9, 333
See application file for complete search history.

(56) References Cited

U.S. PATENT DOCUMENTS

| 2002/0067272 A1* | 6/2002 | Lemelson et al. ........ 340/573.4 |
| 2003/0030569 A1* | 2/2003 | Ulrich et al. ........... 340/825.49 |
| 2003/0222762 A1* | 12/2003 | Beigl et al. ................. 340/5.92 |
| 2003/0227392 A1* | 12/2003 | Ebert et al. ............ 340/825.49 |

* cited by examiner

Primary Examiner—Toan N Pham

(57) ABSTRACT

A method and apparatus for real time reconciliation of object movements with ad hoc network are disclosed. In one embodiment, the method enables near real time tracking of object movement to be provided as a service by utilizing an ad hoc network.

20 Claims, 4 Drawing Sheets

METHOD AND APPARATUS FOR PROVIDING AN OBJECT MOVEMENT TRACKING SERVICE IN A COMMUNICATION NETWORK

The present invention relates generally to communication networks and, more particularly, to a method and apparatus for establishing ad hoc networks for closed user groups for the purpose of real-time tracking and managing of movements of products and objects.

BACKGROUND OF THE INVENTION

The Internet has emerged as a critical communication infrastructure, carrying traffic for a wide range of important scientific, business and consumer applications. Since the Internet has become ubiquitous, more and more businesses are finding clients all over the world. Neither the clients nor the businesses are concerned about the physical proximity. The businesses have become more global with employees, suppliers, vendors and clients spanning the globe. These large businesses rely on the communications infrastructure for everything including, customer care, deployment of new technology, internal communications, etc.

Objects or products that impact a business flow need to be tracked. Businesses that provide services, e.g., the airline industry, and manufacturers, e.g., the automotive industry, need to synchronize their resources and/or products that are typically scattered throughout various locations. Continuous synchronization and optimization of resources provide significant savings for large businesses. However, current object tracking systems don't have a control layer for key stakeholders or user groups. Obtaining information in real time is critical for the business or process flow.

Therefore, there is a need for a communications infrastructure with an object or a product tracking system in a secure, real time environment to exchange commands, alerts, events, actions, full state information and so on among predetermined users.

SUMMARY OF THE INVENTION

In one embodiment, the present invention discloses a method and apparatus for creating an additional control layer over an object movement tracking system. The control layer is used to establish ad hoc closed user group sessions among the people and/or electronic resources (e.g., machines) for real time reconciliation of product movements. The control layer can also be used to synchronize actions with the product movements. Thus, the present invention provides a method for utilizing resources efficiently and reducing the cost of business operations in a global environment.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention broadly discloses a method and apparatus for real time reconciliation of product movements with ad hoc network by creating an additional control layer over one or more object movement tracking systems. The control layer is used to establish ad hoc closed user group sessions among the people and/or electronic resources (e.g., machines) for real time reconciliation of product movements. The control layer can also be used to synchronize actions with the product movements. Although the present invention is discussed below in the context of reconciliation of product movements in a network environment, the present invention is not so limited. Namely, the present invention can be applied in the context of tracking movements of objects and/or users. For example, ships traveling throughout the world need to know potential hazards in the oceans including optical fiber cables, glaciers, other moving ships, changing weather conditions and so on in the same way other companies need to track components needed for manufacturing a particular product. Note that both the objects being tracked and the user groups can freely move while using the present invention.

Figure 1:
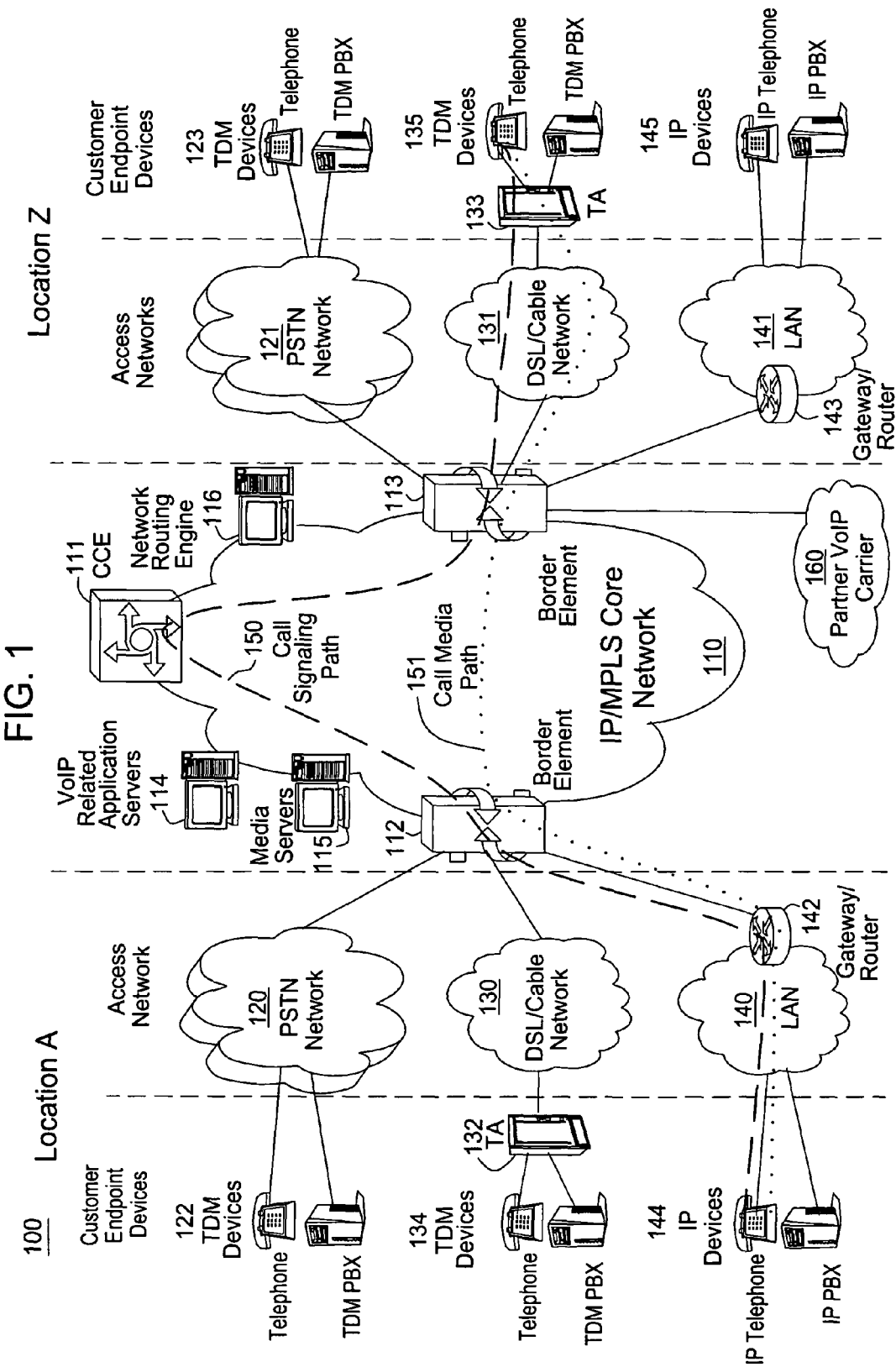
FIG. 1 illustrates an exemplary network related to the present invention.

To better understand the present invention, FIG. 1 illustrates a communication architecture 100 having an example network, e.g., a packet network such as a VoIP network related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network 130, 131 via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such as the Border Elements (BEs) 112 and 113, the Call Control Element (CCE) 111, VoIP related Application Servers (AS) 114, and Media Server (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that require certain service specific features, e.g. translation of an E.164 voice network address into an IP address and so on.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a back-to-back user agent. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP 200 OK response message if SIP is used, is sent in the reverse direction back to the CCE 111. After the CCE 111 receives the call acknowledgement message, it will then send a call acknowledgement signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and to provide services such as announcements, bridges, transcoding, and Interactive Voice Response (IVR) messages for VoIP service applications.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

The above VoIP network is described to provide an illustrative environment in which a large quantity of shared packets may traverse throughout the network. For example, the users may have a variety of customer TDM and IP based endpoint devices 122, 123, 134, 135, 144 and 145. The customers with TDM endpoint devices may access the network via terminal adaptors 132 and 133. Information about the products or objects that are being tracked is shared among all the users. Based on the information, various actions might be taken by some users. Note that some of the actions may be performed in an automated fashion, e.g., by machines and/or computing devices. The change of status because of the actions taken by users is also shared on the same network. Since the tracking and exchange of information may lead to actions by users, it is advantageous to be able to receive the most up to date information. Synchronization of the objects, e.g., movement or availability of the objects, with necessary actions will allow the users to perform the necessary tasks in a timely and efficient manner. For example, if components for manufacturing are being tracked, the synchronization of the objects with the information shared on the ad hoc network may allow for reduction of inventory due to up-to-date and accurate tracking of the numerous manufacturing objects and the necessary actions to be taken. Therefore, it is advantageous to have a method for creating an additional control layer over object movement tracking systems for use by ad hoc closed user groups to synchronize actions with product movement.

Figure 2:
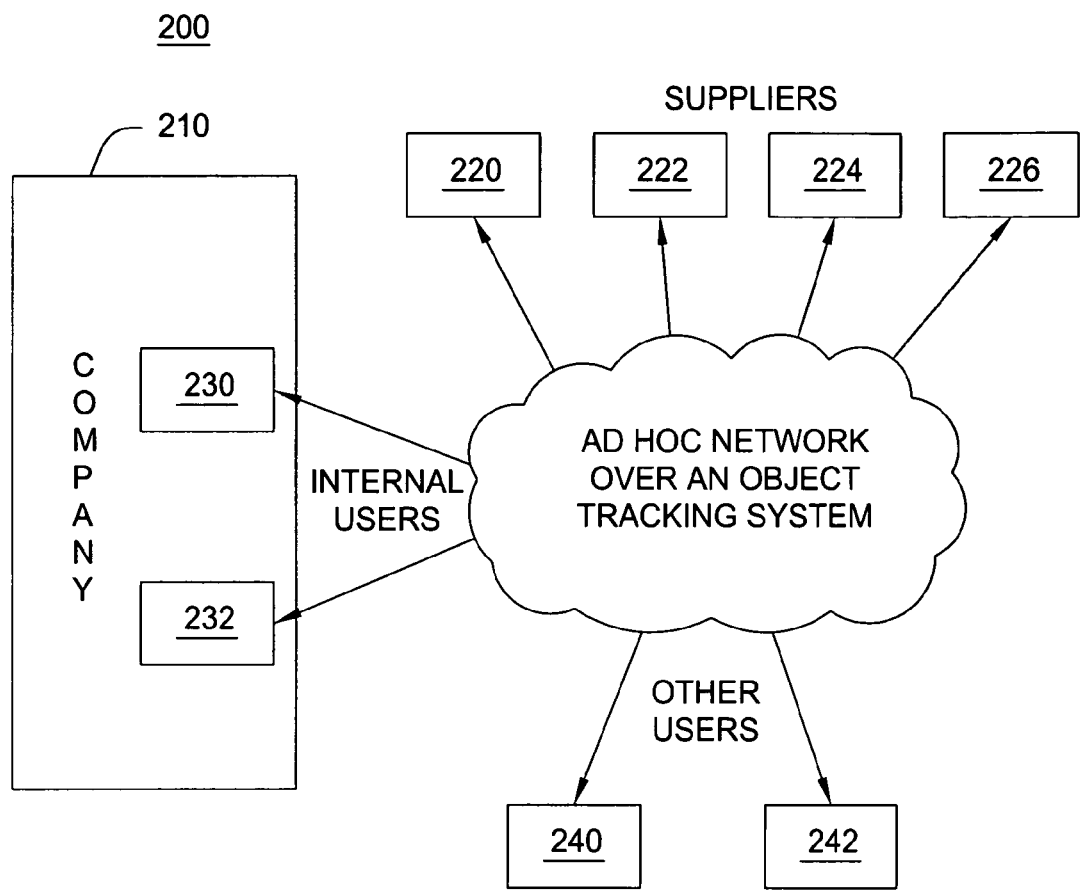
FIG. 2 illustrates an example of a company that utilizes the present invention to track objects and synchronize actions with object movement.

FIG. 2 illustrates an illustrative example 200 of the present invention. For example, a company 210 may utilize the present invention to track objects and synchronize actions. To illustrate, if the company 210 is a computer manufacturer, then it would need to track movement of the various components including but not limited to chips, circuit components, hardware devices, software, and so on.

The component suppliers 220, 222, 224 and 226 are in one user group. In one embodiment, the products can be assigned Radio Frequency Identifications (RFID) or tags and the data is entered for tracking. If their product, schedule, etc. need to be updated, the suppliers enter the information into a database. The company 210 can track the movement of the expected supply and trigger actions based on the information.

For example, if the company 210 has other suppliers, a new order could be issued to obtain the needed supplies from another component vendor, if a first component vendor is having difficulty in meeting a revised schedule.

The internal organizations within company 210, such as 230 and 232, are also in the user group. For example, manufacturing dates may have to be adjusted based due to the revised schedule. However, other components arriving with the original planned date may have to be stocked waiting for the delayed items. Therefore, organizations such as a manufacturing organization that must deal with the delayed components, a financing organization that must deal with paying for the delayed components, a shipping organization that must deal with arranging resources to ship the delayed components and so on, will all be impacted by the revised schedule. As such, the user group can be selectively defined for a particular business or company. The network service provider of the object movement tracking system customizes the tracking and user group during the initial establishment and it is updated as needed. The other users 240 and 242 can be either internal or external to company 210. For example, the users 240 and 242 can be clients (e.g., clients of company 210 who are waiting for finished products that require the delayed components) or service providers (e.g., a shipping company that will ship the finished products to the client of company 210). As such, these other users may also view the movement of the objects to plan resources accordingly as well.

Therefore, the present invention provides at least one control layer above product movement tracking systems to be used by an ad hoc closed user group established within a secured real time environment. The users will perform the tasks required to synchronize actions with product movement. Optimization of the tracking of products and objects with additional layers of control, and the automation of interactions among the key stakeholders will reduce the cost of doing business.

In one embodiment, the service provider provides the tools that the ad hoc closed user group will be using. The RFID tracking is implemented in a secured, trusted real time environment to effect the exchange of commands, alerts, events, actions, and full state information of objects for the purpose of managing product movements.

Optimization of related resources such as directing staff to take appropriate actions and tracking related complementary objects is also managed and automated. Namely, appropriate actions can be predefined and associated with the tracked movements of objects, where the appropriate actions can be personalized to a particular business.

The policies of the closed user group for the product movements and the heuristic rules are enforced by the tracking systems. These policies and heuristic rules can be supplied by the service provider and modified by the user as needed or appropriate. Since the use of RFID enables a tracking system to count every item at every touch point in the system, the control tools for the closed user group are used for optimizing the support and actions necessary to manage the dynamics of movements. The present invention provides an RFID management layer based on a set of personalized heuristic rules. The business processes are automated by tracking and managing the related resources. The object tracking control tools synchronize product movements with other resources necessary to accomplish the job.

Figure 3:
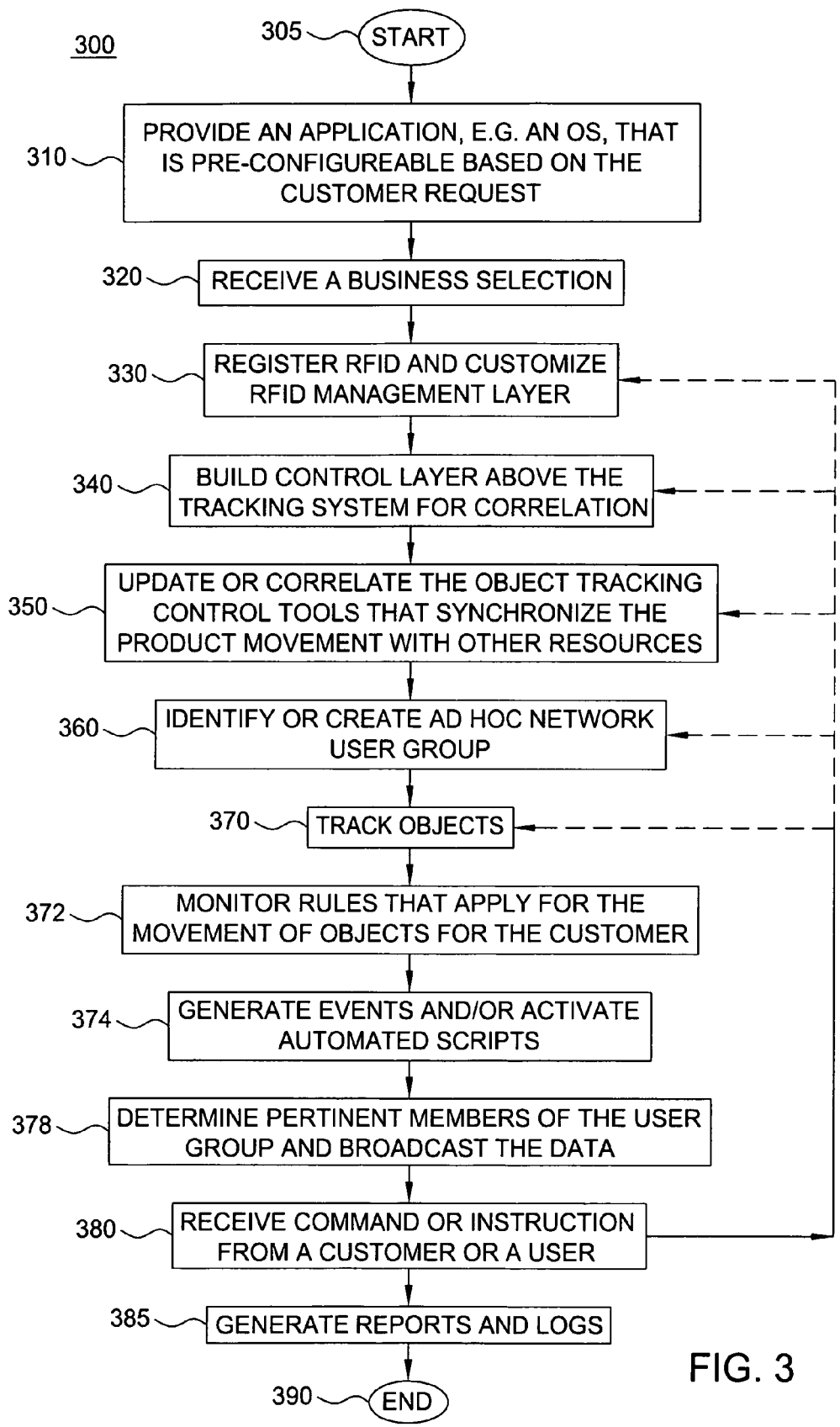
FIG. 3 illustrates a flowchart of a method for real time reconciliation of product movement with ad hoc network.

FIG. 3 illustrates the flowchart of a method 300 for real time reconciliation of product movement with ad hoc network. Method 300 starts in step 305 and proceeds to step 310.

In step 310, method 300 provides an application, e.g., an operating system (OS), that is pre-configurable based on the business needs that can be deployed over an object movement tracking system. The OS can be configured to include but not limited to:

Method for selecting a business type;
Method for establishing one or more closed user groups;
Method for registering RFIDs;
Methods for establishing and entering heuristic rules for tracking of objects;
Methods for predefining actions to be taken and logging the actions including pertinent command and control;
Method for identifying elements of the business for automation;
Method for updating the control tools for object tracking in order to synchronize the product movement with other resources; and
Method for generating reports such as summary and action logs.

In step 320, method 300 receives a business selection, e.g., a service provider may present a customer with a listing of business types where a customer will select one of the presented options. If defaults are provided, the selection of the business type may optionally determine the default settings. Namely, the OS portion that is provided for selecting a business type can be used to establish defaults. For example, if a customer is a publisher of books, then a default set of parameters built for a publisher can be used, or presented to a user for modification. Namely, it is assumed that another customer with a similar business profile will likely operate under similar constraints, e.g., tracking the same type of objects such as paper, ink, illustrations, etc. Thus, providing defaults can reduce the time needed to customize the system for a particular customer.

Alternatively, the defaults may simply be used as a starting point for the customization. The method then proceeds to step 330.

In step 330, method 300 registers the RFID and customizes the RFID management layer. Namely, the objects to be tracked with RF devices will need to undergo a registering process. The RFID tracking could include suppliers and/or only internal user groups depending on the business of the customer. The customization includes entering the heuristic rules for tracking the objects, the rules for taking appropriate actions, the rules for logging actions and identifying elements of the business for automation. Different degrees of automation can be performed for different customers. If defaults were provided in step 320, the defaults can be used in this step.

In step 340, method 300 builds a control layer above the tracking system for correlation. Namely, method 300 deploys a control layer that can interact or be synchronized with various tracking systems as defined by a customer. Specifically, the automatic tracking and managing of resources requires establishing object relationships. For example, components (e.g., such as chips, resistors, capacitors, circuit boards and the like), to be used in the manufacturing an electronic product, need to be linked to the electronic product being manufactured and to any other components that are required to complete the product being manufactured. Typically, each user, organization, or vendor would have a separate tracking system. By designing a control layer that can communicate with these disparate tracking systems, the present invention will allow a service provider of a communication network to provide a service to its customer for providing real time reconciliation of object movements.

In step 350, method 300 updates, correlates or synchronizes the control layer with object tracking control tools that are deployed in various tracking systems as defined by the customer. For example, a customer may inform the locations and types of object tracking control tools that the control layer will need to interact with. For example, this step is needed to make sure the correlation of objects identified in step 340 and the RFID information in step 330 are used to synchronize the product movement with other resources.

In step 360, method 300 identifies or creates an ad hoc user group. The ad hoc user group is defined by a customer. For example, the ad hoc user group may comprise all the component suppliers used by the customer, all the shipping companies used by the component suppliers, all the clients of the customer, all the shipping companies used by the customer, an internal manufacturing department of the customer, an internal accounting department of the customer and so on. As such, the group can include both people and computing systems. The user group can be selectively adjusted by the customer as the business needs change. Establishment of different security levels and/or access levels can be established, such as passwords in this step. At the end of step 360, the method 300 is now fully customized for the customer.

In step 370, method 300 tracks the objects as defined by the customer, e.g., the objects' location, scheduled delivery time, and so on.

In step 372, method 300 monitor rules that may apply for the movement of the objects being tracked as established for the customer in step 330. For example, rules may include where an object should be for a given time or for a given day, how many objects are there for a given time or for a given day, what is the relative geographic location of one object relative to another object, and so on.

In step 374, method 300 generates events and activates automated scripts for the rules that are met or triggered in step 372. For example, an object may be detected to be out of sequence in time or location, e.g., is delayed during shipping such that it will create an impact, e.g., idling a production line. Another example may comprise detecting a buildup of finished objects at a depot where shipping resources, e.g., trucks, trains, ships, planes are out of anticipated positions.

In one embodiment, automated scripts can be activated in response to the detected event. Another example may comprise activating a recovery procedure, e.g., automatically generating a purchase order for the delayed components from another vendor who can deliver the delayed components in accordance to a predefined schedule and so on. In yet another example, no recovery action is taken, but instead a delivery schedule is automatically updated in accordance with the detected delay and so on.

In step 378, method 300 determines the pertinent members of the user group as provided in step 360 and broadcasts the data from step 374 to the pertinent members. For example, the event information detected in step 374 can be broadcasted, e.g., sending alarms to the customer and/or to at least one pertinent member of the user group so that corrective actions can be taken.

In step 380, method 300 receives a command or instruction from the customer or a member of the user group and proceeds to the appropriate step based on the input. For example, the command may require a new object to be tracked, where the method may proceed back to step 330 to identify the object and the associated RFID of the object. Alternatively, the command may require a new member to be identified in the user group in step 360, where the control layer may need to be modified to interact with this new member in step 340 and so on.

In step 385, method 300 may generate summary reports and/or logs as required by the customer. Note that this step can be performed in the background and method 300 can proceed to the next step regardless of the reports being generated. The method then ends in step 390.

It should be noted that the steps of FIG. 3 is not required to be implemented in the specific sequence as shown. The present invention as described above allows a service provider of a communication network to provide an application for the tracking and managing of objects for its customers or subscribers. This unique approach allows the service provider who operates the communication network to provide an ad hoc real-time reconciliation of object movement service.

Figure 4:
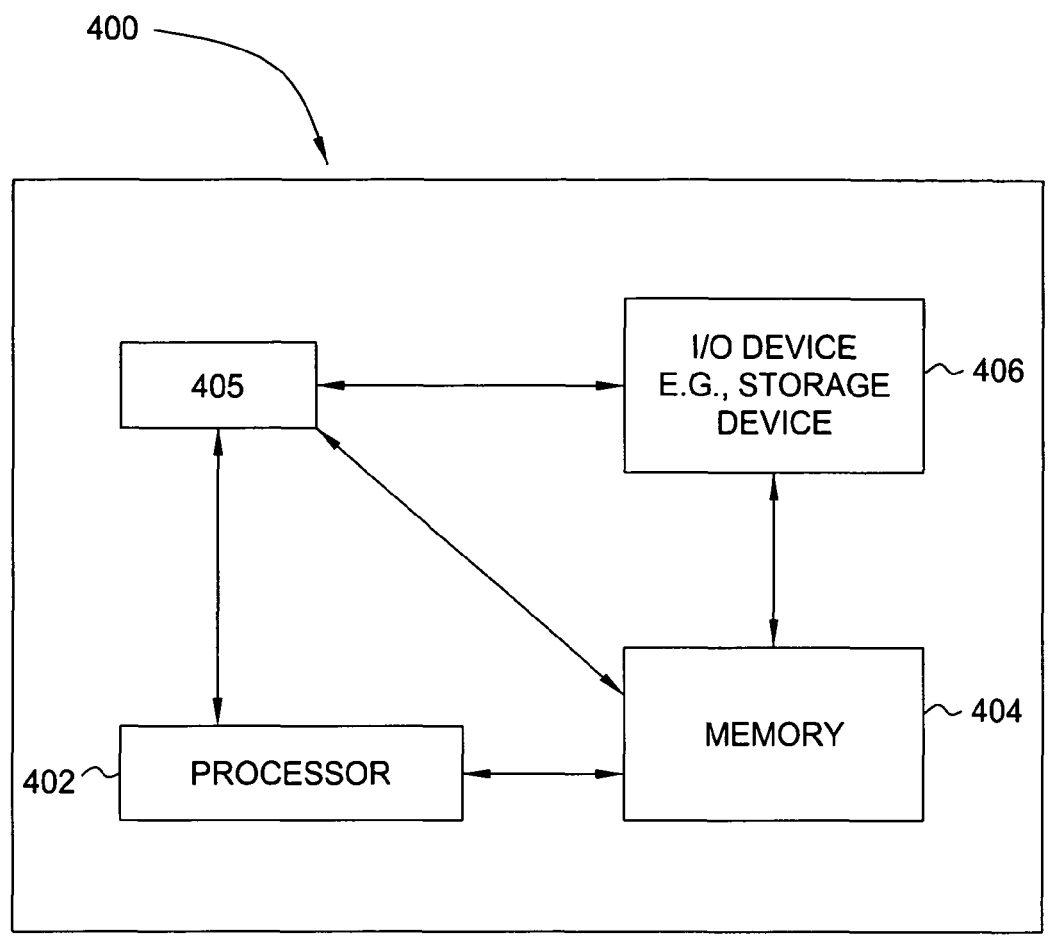
FIG. 4 illustrates a high-level block diagram of a general-purpose computer suitable for use in performing the functions described herein.

FIG. 4 depicts a high-level block diagram of a general-purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for real time reconciliation of product movement with an ad hoc network, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention could be implemented in software and/or in a combination of software and hardware, e.g., using application specific integrated circuits (ASIC), a general-purpose computer or any other hardware equivalents. In one embodiment, the present module or process 405 for real time reconciliation of product movement with an ad hoc network can be loaded into memory 404 and executed by processor 402 to implement the functions as discussed above. As such, the present method 405 for real time reconciliation of product movement with an ad hoc network (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing an object movement tracking service in a communication network, comprising:
   defining a plurality of members to be included into a user group as defined by a customer, where two members of the user group have different object tracking control tools;
   synchronizing the different object tracking control tools of the two members; and
   tracking a movement of a plurality of objects as defined by the customer.

2. The method of claim 1, wherein the communication network is an internet protocol network.

3. The method of claim 1, wherein the plurality of objects is identified with radio frequency identifications.

4. The method of claim 1, further comprising:
   allowing the customer to define a rule pertaining to the movement of the plurality of objects.

5. The method of claim 4, further comprising:
   detecting an occurrence of an event associated with the rule.

6. The method of claim 5, further comprising:
   activating an automated script in accordance with the event.

7. The method of claim 5, further comprising:
generating a notification in accordance with the event.

8. The method of claim 7, wherein the notification is provided to the customer.

9. A non-transitory computer-readable medium having stored thereon a plurality of instructions, the plurality of instructions including instructions which, when executed by a processor, cause the processor to perform a method for providing an object movement tracking service in a communication network, comprising:
- defining a plurality of members to be included into a user group as defined by a customer, where two members of the user group have different object tracking control tools;
- synchronizing the different object tracking control tools of the two members; and
- tracking a movement of a plurality of objects as defined by the customer.

10. The non-transitory computer-readable medium of claim 9, wherein the communication network is an internet protocol network.

11. The non-transitory computer-readable medium of claim 9, wherein the plurality of objects is identified with radio frequency identifications.

12. The non-transitory computer-readable medium of claim 9, further comprising:
allowing the customer to define a rule pertaining to the movement of the plurality of objects.

13. The non-transitory computer-readable medium of claim 12, further comprising:
detecting an occurrence of an event associated with the rule.

14. The non-transitory computer-readable medium of claim 13, further comprising:
activating an automated script in accordance with the event.

15. The non-transitory computer-readable medium of claim 13, further comprising:
generating a notification in accordance with the event.

16. The non-transitory computer-readable medium of claim 15, wherein the notification is provided to the customer.

17. An apparatus for providing an object movement tracking service in a communication network, comprising:
- means for defining a plurality of members to be included into a user group as defined by a customer, where two members of the user group have different object tracking control tools;
- means for synchronizing the different object tracking control tools of the two members; and
- means for tracking a movement of a plurality of objects as defined by the customer.

18. The apparatus of claim 17, wherein the communication network is an internet protocol network.

19. The apparatus of claim 17, wherein the plurality of objects is identified with radio frequency identifications.

20. The apparatus of claim 17, further comprising:
means for allowing the customer to define a rule pertaining to the movement of the plurality of objects.

* * * * *